(12) United States Patent
Onaka

(10) Patent No.: US 11,378,869 B2
(45) Date of Patent: Jul. 5, 2022

(54) OPTICAL ELEMENT HOLDING APPARATUS WITH ORTHOGONALLY INSERTED HOLDING BASE

(71) Applicant: CANON KABUSHIKI KAISHA, Tokyo (JP)

(72) Inventor: Tomoya Onaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/091,808

(22) Filed: Nov. 6, 2020

(65) Prior Publication Data

US 2021/0141292 A1    May 13, 2021

(30) Foreign Application Priority Data

Nov. 11, 2019   (JP) .............................. JP2019-204310

(51) Int. Cl.
| | |
|---|---|
| *G03B 17/12* | (2021.01) |
| *G02B 7/02* | (2021.01) |
| *H04N 5/225* | (2006.01) |
| *G03B 11/00* | (2021.01) |

(52) U.S. Cl.
CPC .............. *G03B 17/12* (2013.01); *G02B 7/02* (2013.01); *G03B 11/00* (2013.01); *H04N 5/2254* (2013.01)

(58) Field of Classification Search
CPC .................................................. G02B 26/023
See application file for complete search history.

(56) References Cited

U.S. PATENT DOCUMENTS

| | | | | |
|---|---|---|---|---|
| 2,399,658 | A * | 5/1946 | Banker | G02B 26/023 |
| | | | | 359/489.2 |
| 9,971,938 | B2 * | 5/2018 | Li | G06K 9/00604 |
| 10,228,571 | B2 * | 3/2019 | Wada | H04N 5/2254 |
| 2012/0257097 | A1 | 10/2012 | Takai | |
| 2015/0002730 | A1 * | 1/2015 | Shi | H04N 5/23245 |
| | | | | 348/361 |
| 2020/0101906 | A1 * | 4/2020 | Kobayashi | H04N 5/2257 |
| 2021/0200059 | A1 * | 7/2021 | Iinuma | H04N 5/238 |

FOREIGN PATENT DOCUMENTS

| | | |
|---|---|---|
| CN | 105635528 A | 6/2016 |
| EP | 3477936 A1 | 5/2019 |
| EP | 3722856 A1 | 10/2020 |
| EP | 3722857 A1 | 10/2020 |
| JP | H04-163429 A | 6/1992 |
| JP | 2019-079031 A | 5/2019 |

* cited by examiner

*Primary Examiner* — Leon W Rhodes, Jr.
(74) *Attorney, Agent, or Firm* — Canon U.S.A., Inc. IP Division

(57) ABSTRACT

A fixing component fixes an imaging lens and have a side surface including an opening. A holding frame holds an optical element. A holding base is inserted into the opening from a direction orthogonal to an optical axis of the imaging lens and holds the holding frame. A driving gear drives the holding frame in the direction orthogonal to the optical axis of the imaging lens. The holding base has an engagement portion that engages with the driving gear when the holding base is inserted into the opening.

11 Claims, 12 Drawing Sheets

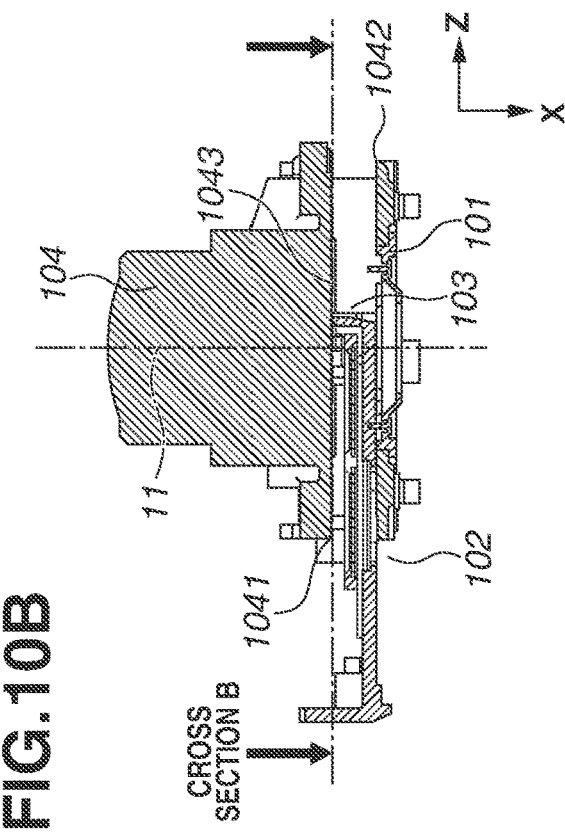
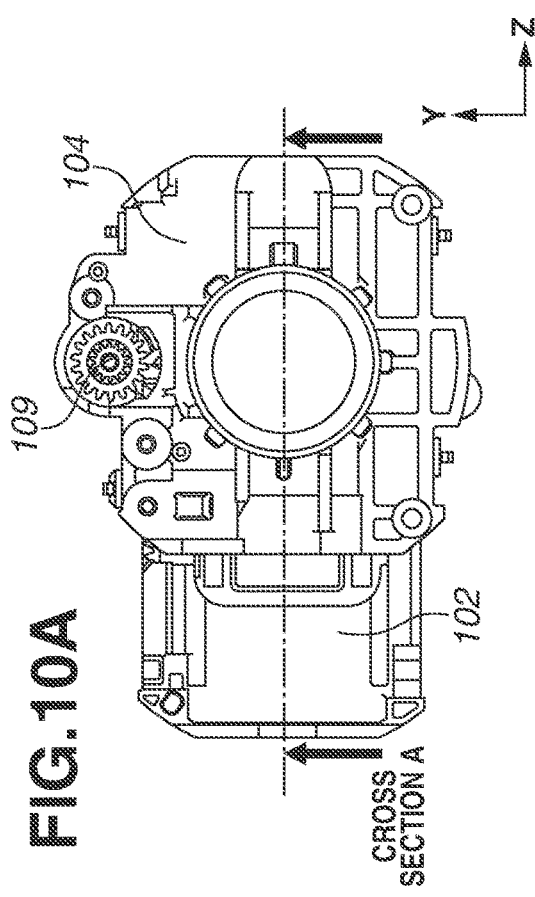
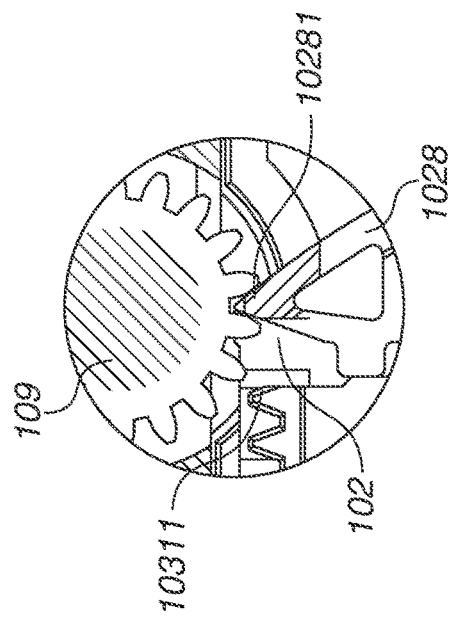
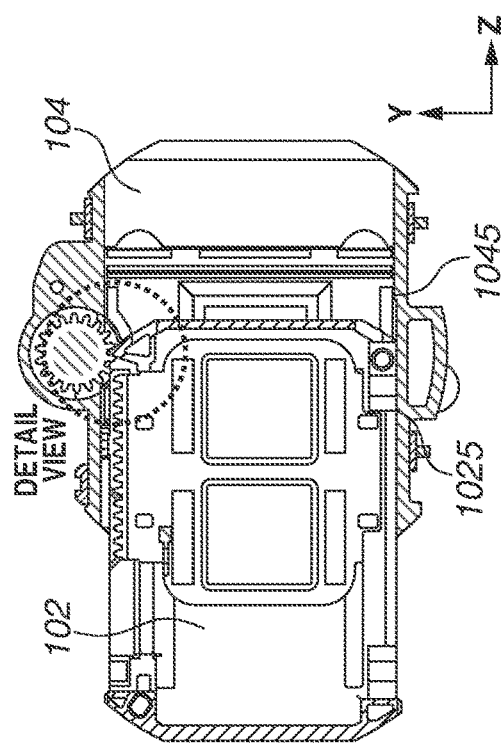
FIG.10A
FIG.10B
FIG.10C
FIG.10D

OPTICAL ELEMENT HOLDING APPARATUS WITH ORTHOGONALLY INSERTED HOLDING BASE

BACKGROUND OF THE DISCLOSURE

Field of the Disclosure

The aspect of the embodiments relates to apparatuses, in particular, apparatuses including a mechanism that inserts and removes an optical element, such as an optical filter, into and from an optical path.

Description of the Related Art apparatuses, such as monitoring cameras, that include an optical filter selection mechanism have been known. The optical filter selection mechanism removes and places an infrared cut optical filter from and on an optical path to acquire an image using infrared rays during image capturing at night or in the dark.

A method of assembling an optical filter to a lens barrel from an aperture formed on a side surface of the lens barrel is also known. For example, Japanese Patent Laid-Open No. H4-163429 discusses a diaphragm unit as a mechanism that slides a blade using an actuator having a lever. In the mechanism, an optical filter frame holding an optical filter and a driving source motor are fixed to the diaphragm unit, and the diaphragm unit is assembled through an aperture formed on a side surface of a lens barrel.

SUMMARY OF THE DISCLOSURE

An apparatus comprising: a fixing component configured to fix an imaging lens and have a side surface including an aperture; a holding frame configured to hold an optical element; a holding base configured to be inserted into the aperture from a direction orthogonal to an optical axis of the imaging lens and hold the holding frame; and a driving gear configured to drive the holding frame in the direction orthogonal to the optical axis of the imaging lens, wherein the holding base has an engagement portion that engages with the driving gear when the holding base is inserted into the aperture.

Further features of the disclosure will become apparent from the following description of exemplary embodiments with reference to the attached drawings.

BRIEF DESCRIPTION OF THE DRAWINGS

FIG. 10A is a diagram illustrating a state where the filter base is being assembled to the lens holder.
FIG. 10B is a diagram illustrating a state where the filter base is being assembled to the lens holder.
FIG. 10C is a diagram illustrating a state where the filter base is being assembled to the lens holder.
FIG. 10D is a diagram illustrating a state where the filter base is being assembled to the lens holder.

DESCRIPTION OF THE EMBODIMENTS

Figure 1:
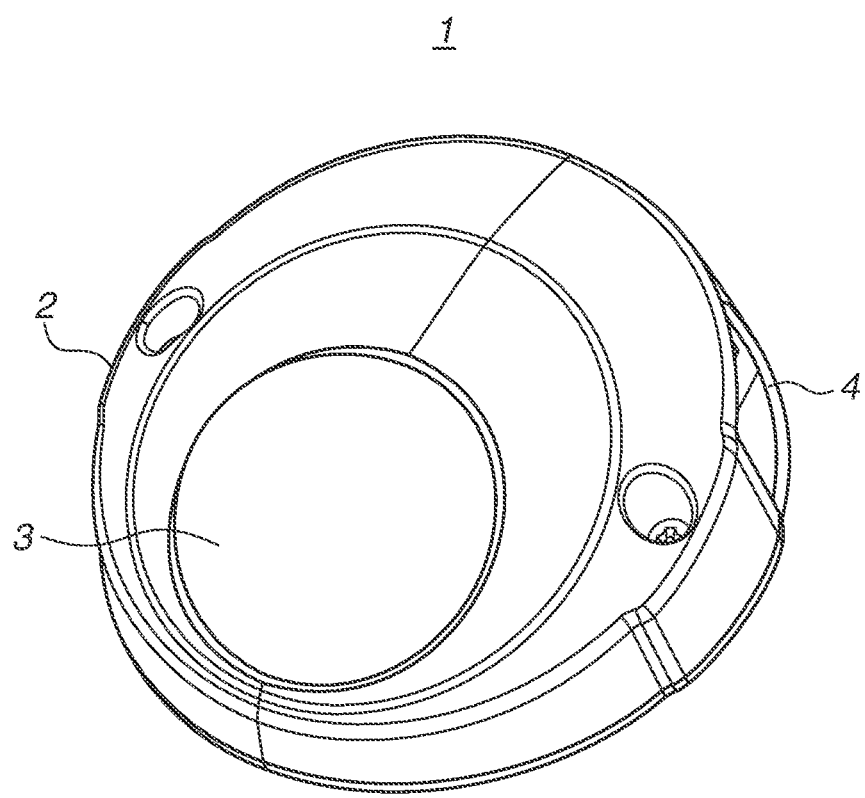
FIG. 1 is an external view of a network camera.

According to Japanese Patent Laid-Open No. H4-163429 described above, an optical filter and a motor in an integrated state are inserted from an aperture to be assembled. Thereafter, wires of the motor are electrically connected to an image sensor substrate and other substrates and fixed. Thus, for example, in a case where an error is detected during assembly of a product and the product is to be disassembled, first the electric wires connected to the motor need to be removed, and the optical filter and the motor need to be removed together. There is an issue that it is not easy to assemble and disassemble, accordingly.

According to an exemplary embodiment of the disclosure, an apparatus that realizes easy removal of an optical element selection unit from a lens barrel and easy assembly of the optical element selection unit to the lens barrel is provided.

Hereinafter, embodiments will be described in detail with reference to the attached drawings. Note, the following embodiments are not intended to limit the scope of the aspect of the embodiments. Multiple features are described in the embodiments, but limitation is not made a disclosure that requires all such features, and multiple such features may be combined as appropriate. Furthermore, in the attached drawings, the same reference numerals are given to the same or similar configurations, and redundant description thereof is omitted.

<Entire Structure of Network Camera>

An entire structure of a network camera 1 will now be described with reference to FIG. 1 as an example of an apparatus. FIG. 1 is an external view of the network camera 1.

The network camera 1 includes a fixing cover 2, a dome cover 3, a base 4, a pan/tilt/rotation unit (not illustrated), and an imaging unit 10.

The fixing cover 2 is attached and fixed to the base 4.

The dome cover 3 has a hemispherical shape. The dome cover 3 is a transparent resin member, and fixed to the fixing cover 2. The dome cover 3, the fixing cover 2, and the base 4 form a housing. In the housing, the pan/tilt/rotation unit and the imaging unit 10 are arranged.

The pan/tilt/rotation unit is a member that rotatably supports the imaging unit 10 in pan/tilt/rotation directions.

Figure 2:
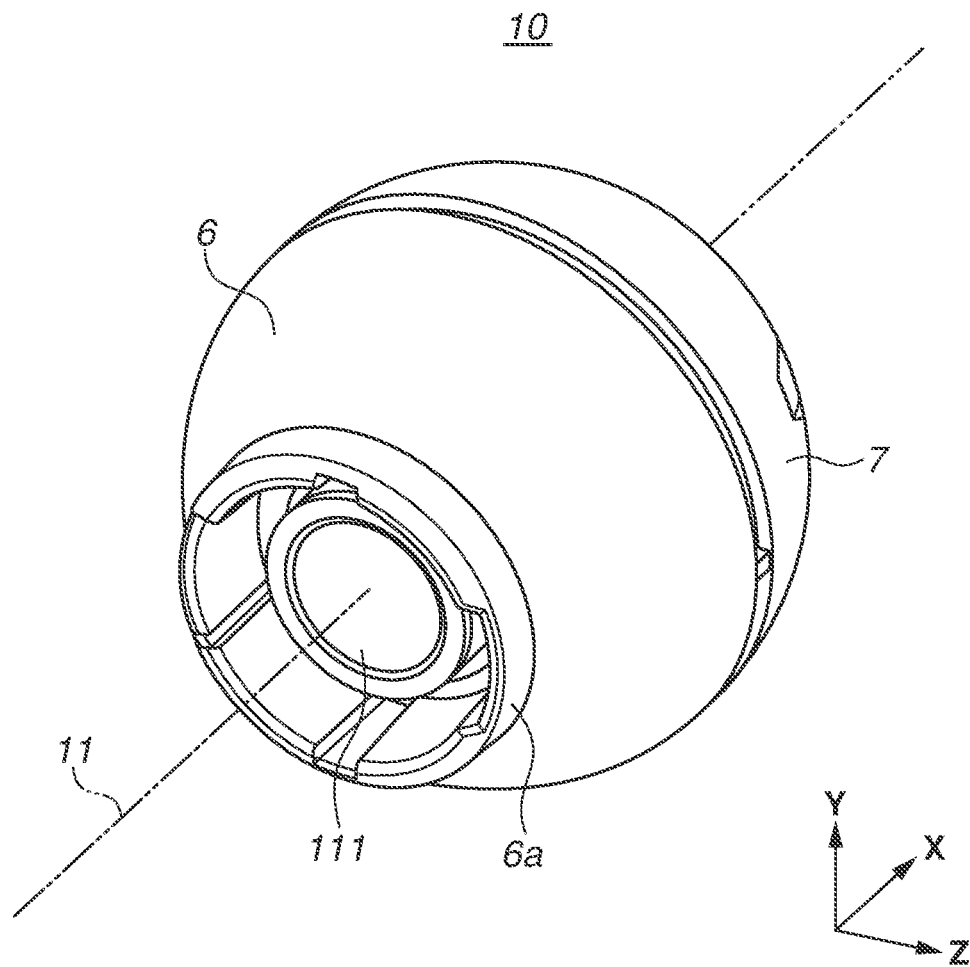
FIG. 2 is an external view of an imaging unit mounted on the network camera.
Figure 3:
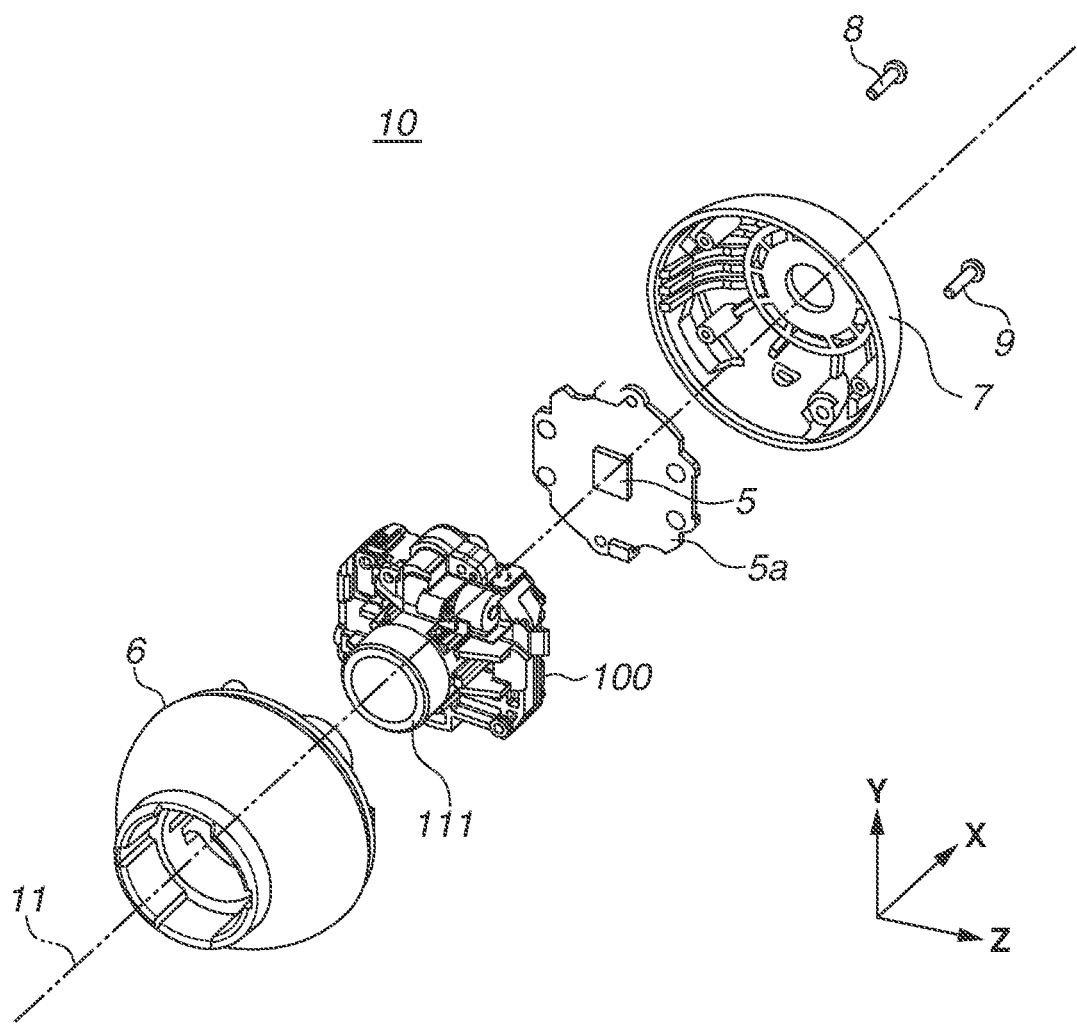
FIG. 3 is an exploded perspective view of the imaging unit.

The imaging unit 10 includes a lens 111 and an image sensor 5 as illustrated in FIGS. 2 and 3. Details of the imaging unit 10 will be described below.

<Structure of Imaging Unit>

Details of the imaging unit 10 will now be described with reference to FIGS. 2 and 3. FIG. 2 is an external view of the imaging unit 10 to be mounted on the network camera 1. FIG. 3 is an exploded perspective view of the imaging unit 10. The imaging unit 10 includes a front cover 6, a rear cover 7, the image sensor 5, and a lens barrel 100 as illustrated in FIG. 3.

The front cover 6 includes an opening 6a and covers the lens barrel 100. The lens 111 is inserted from the opening 6a. The front cover 6 is located on the side nearer the dome cover 3.

The rear cover 7 covers the lens barrel 100 and the image sensor 5. The front cover 6 and the rear cover 7 are fixed together with screws 8 and 9. The lens barrel 100 and the image sensor 5 integrated together are internally sandwiched between the front cover 6 and the rear cover 7.

The image sensor 5 converts an optical subject image formed by an optical system into an electric signal.

The lens barrel 100 includes a filter holder 103, and the filter holder 103 holds an infrared cut filter (IRCF) 106. Details of the lens barrel 100 will be described below.

<Structure of Lens Barrel>

Figure 4:
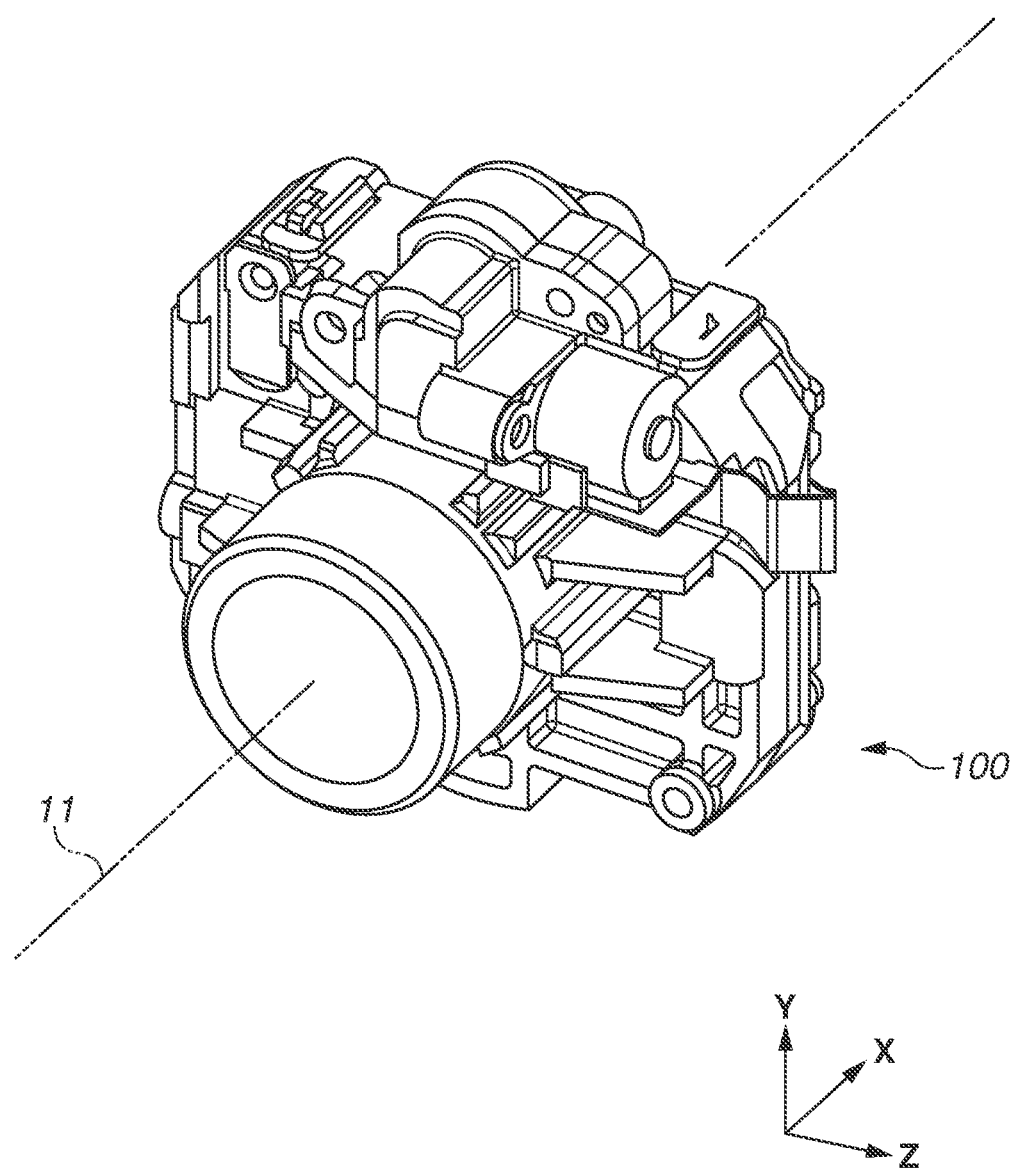
FIG. 4 is a perspective view of a lens barrel.
Figure 5:
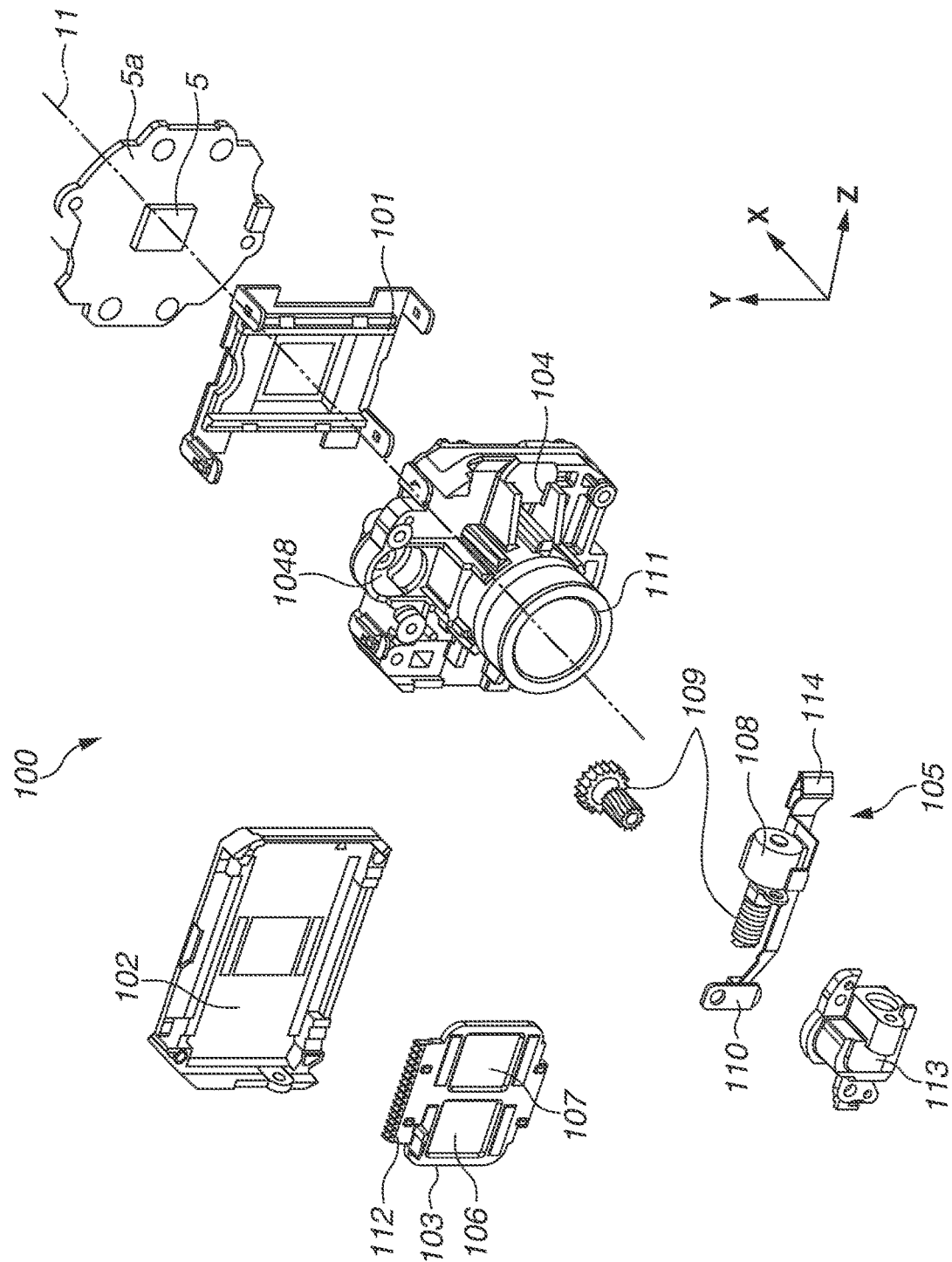
FIG. 5 illustrates an exploded perspective view of the lens barrel.

Details of the lens barrel 100 will now be described with reference to FIGS. 4 and 5. FIG. 4 is a perspective view of the lens barrel 100. FIG. 5 is an exploded perspective view of the lens barrel 100. The lens barrel 100 includes an image sensor protection rubber 101, a filter base 102 (holding base), the filter holder 103 (holding frame), a lens holder 104 (fixing component), and an actuator 105 as illustrated in FIG. 5.

The image sensor protection rubber 101 is a member for protecting the image sensor 5 and is situated between the filter base 102 and an image sensor substrate 5a.

The filter base 102 is a member for holding the filter holder 103. The filter base 102 holding the filter holder 103 is inserted into an aperture 1041 (refer to FIG. 8C) of the lens holder 104, and thereby being attached to the lens holder 104.

The filter holder 103 is a member for holding the IRCF 106 (optical element) and a glass 107 (optical element). The filter holder 103 is placed on and removed from an optical path by the actuator 105. For example, in a case where a sufficient amount of light is provided to the image sensor 5, the IRCF 106 is placed on an optical axis 11, whereas in a case where a sufficient amount of light is not provided to the image sensor 5, the IRCF 106 is removed from the optical axis 11. The glass 107 prevents a focal point position from changing when the IRCF 106 is removed from the optical axis 11, especially in a case where the lens barrel 100 is a lens having a fixed focal point.

The lens holder 104 holds the lens 111 (imaging lens). The image sensor protection rubber 101, the image sensor substrate 5a with the image sensor 5 mounted thereon, and the actuator 105 are attached to the lens holder 104. The lens holder 104 includes the aperture 1041 (refer to FIG. 8C) and an actuator attachment portion 1048. Through the aperture 1041 (refer to FIG. 8C), the filter base 102 holding the filter holder 103 is to be inserted. The actuator 105 is to be attached to the actuator attachment portion 1048. In the present exemplary embodiment, the lens 111 is fixed to the lens holder 104. However, the lens holder 104 may have a mount portion to which a removable interchangeable lens is to be attached.

The actuator 105 is a member for placing the filter holder 103 on the optical axis 11 or removing the filter holder 103 from the optical axis 11. The actuator 105 includes a motor 108 and a gear train 109 (driving gear). The gear train 109 is covered by a gear cover 113 and engaged with a gear engagement portion 1031 of the filter holder 103. This engagement transmits driving force of the motor 108 to the filter holder 103. A control unit (not illustrated) changes a voltage to the motor 108 and a rotation direction of the motor 108, thereby moving the filter holder 103 in a direction orthogonal to the optical axis 11 and removing the filter holder 103 from the optical path.

The actuator 105 includes a photo-interrupter 110. When the IRCF 106 is removed from the optical axis 11, a light shielding portion 112 attached to the filter holder 103 shields the photo-interrupter 110 from light. When the IRCF 106 is on the optical axis 11, light enters the photo-interrupter 110. With this structure, it is detected whether the IRCF 106 is on the optical axis 11. A flexible print substrate 114 electrically connects the motor 108 and the photo-interrupter 110 to the image sensor substrate 5a, to which the image sensor 5 is connected, and a main substrate (not illustrated).

<Details of Filter Base Structure>

Figure 6B:
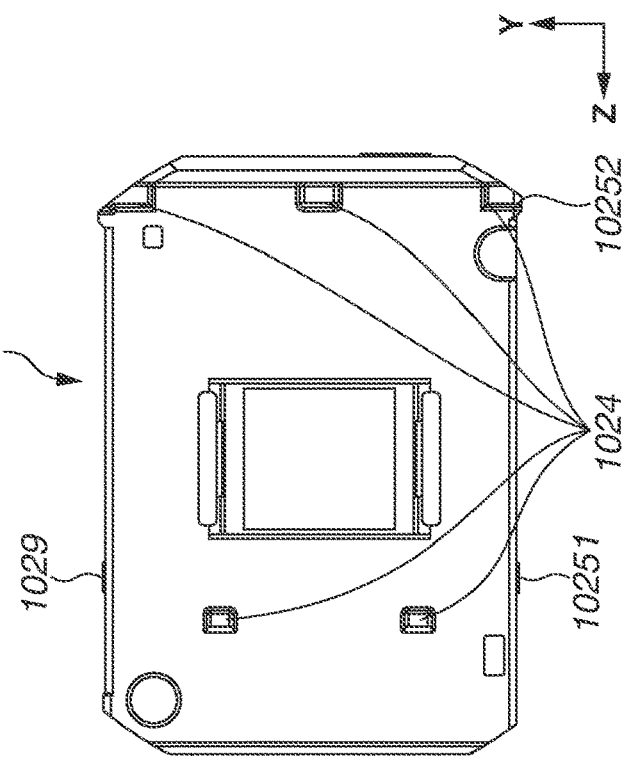
FIG. 6B illustrates an external view of the filter base viewed from the back.
Figure 6A:
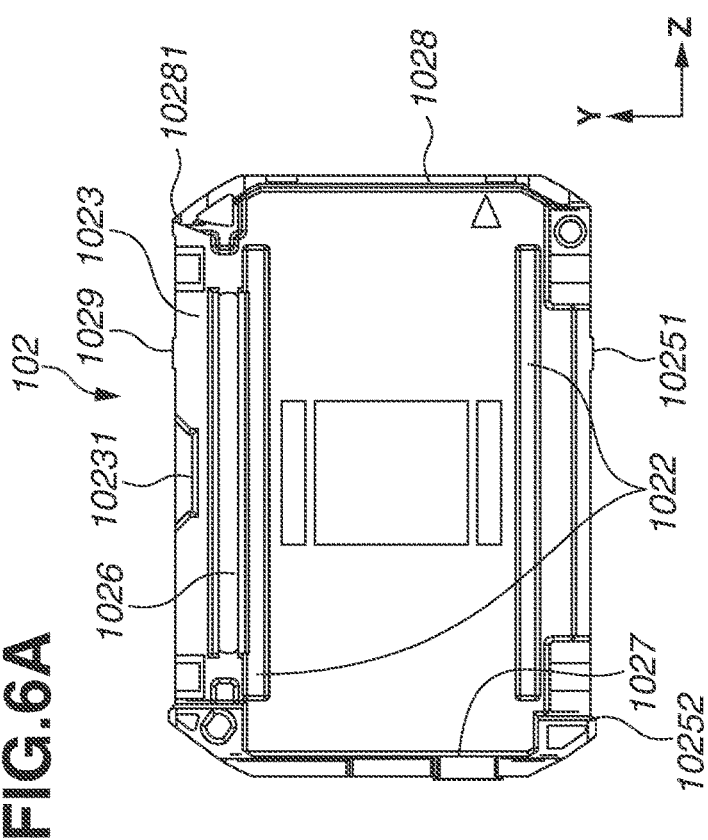
FIG. 6A illustrates an external view of a filter base viewed from the front.
Figure 6D:
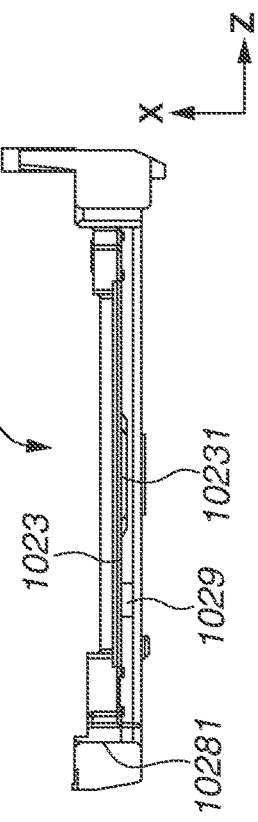
FIG. 6D illustrates an external view of the filter base viewed from the top.
Figure 6C:
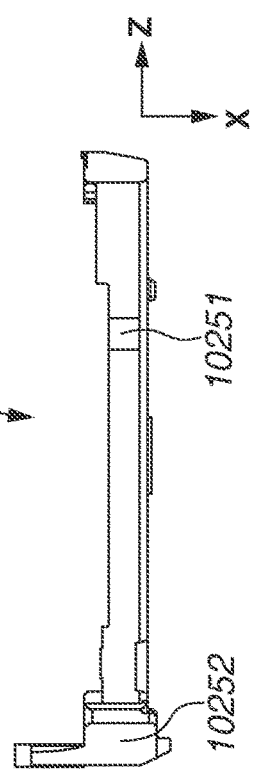
FIG. 6C illustrates an external view of the filter base viewed from the bottom.

Next, details of the filter base 102 will be described with reference to FIGS. 6A to 6D. FIG. 6A illustrates an external view of the filter base 102 viewed from the lens 111. FIG. 6B illustrates an external view of the filter base 102 viewed from the image sensor 5. FIG. 6C is an external view of the filter base 102 illustrated in FIG. 6A viewed from the bottom. FIG. 6D illustrates an external view of the filter base 102 in FIG. 6B viewed from the top.

The filter base 102 includes a guide 1026, sliding surfaces 1022, a bottom plate 1023, side walls 1027 and 1028, an abutment surface 10251 (second abutment), an abutment surface 10252, and an abutment surface 1029 as illustrated in FIG. 6A. The filter base 102 also includes abutment surfaces 1024 (fourth abutment) as illustrated in FIG. 6B.

The guide 1026 and the sliding surfaces 1022 are members for guiding the filter holder 103 to place and remove the filter holder 103 on and from the optical axis 11. When the filter holder 103 moves in a direction (right-left direction) orthogonal to the optical axis 11, the guide 1026 engages with guides 1036 (described below) of the filter holder 103, and the sliding surfaces 1022 slides against sliding surfaces 1032 (described below) of the filter holder 103.

The abutment surfaces 1024 are members for clearing a space between the filter base 102 and the lens holder 104 by moving the filter base 102 toward the lens holder 104 when the assembly of the filter base 102 to the lens holder 104 is completed. Specifically, when the assembly of the filter base 102 to the lens holder 104 is completed, the abutment surfaces 1024 abuts abutment surfaces 1044 of the lens holder 104, so that a length of a gap between the filter base 102 and the lens holder 104 becomes substantially zero in a front-rear direction. The abutment surfaces 1024 are also formed on the opposite side to the surface on which the guide 1026 and the sliding surfaces 1022 are formed. In other words, the abutment surfaces 1024 are formed on the side of the image sensor substrate 5a.

The bottom plate 1023 includes a depressed portion 10231 near the gear train 109.

The side walls 1027 and 1028 are provided at respective ends of the filter base 102. An end of the side wall 1028 has a substantially acute-angled shape portion 10281 (engagement portion). The substantially acute-angled shape portion 10281 engages with the gear train 109 and rotates the gear train 109 when the filter base 102 is assembled to the lens holder 104. The substantially acute-angled shape portion 10281 in the present exemplary embodiment has a gear shape that is substantially the same as the gear engagement portion 1031. However, the substantially acute-angled shape portion 10281 can have any shape as long as the shape does not obstruct the rotation of the gear train 109. The substantially acute-angled shape portion 10281 comes near an inner wall of the lens holder 104 when the filter base 102 is assembled to the lens holder 104. The substantially acute-angled shape portion 10281 thereby has a function of reducing entering dust in parallel.

The abutment surfaces 10251 and 10252 protrude from a lower surface of the filter base 102. The abutment surfaces 10251 and 10252 abut an abutment surface 1045 of the lens holder 104 when the filter base 102 is assembled to the lens holder 104. With this structure, the substantially acute-angled shape portion 10281 of the filter base 102 is brought near the inner wall of the lens holder 104 to thereby reduce entering dust. The abutment surface 1045 will be described below.

The abutment surface 1029 protrudes from an upper surface of the filter base 102. The abutment surface 1029 abuts an abutment surface 1049 of the lens holder 104 when the filter base 102 is assembled to the lens holder 104.

<Details of Structure of Filter Holder>

Figure 7A:
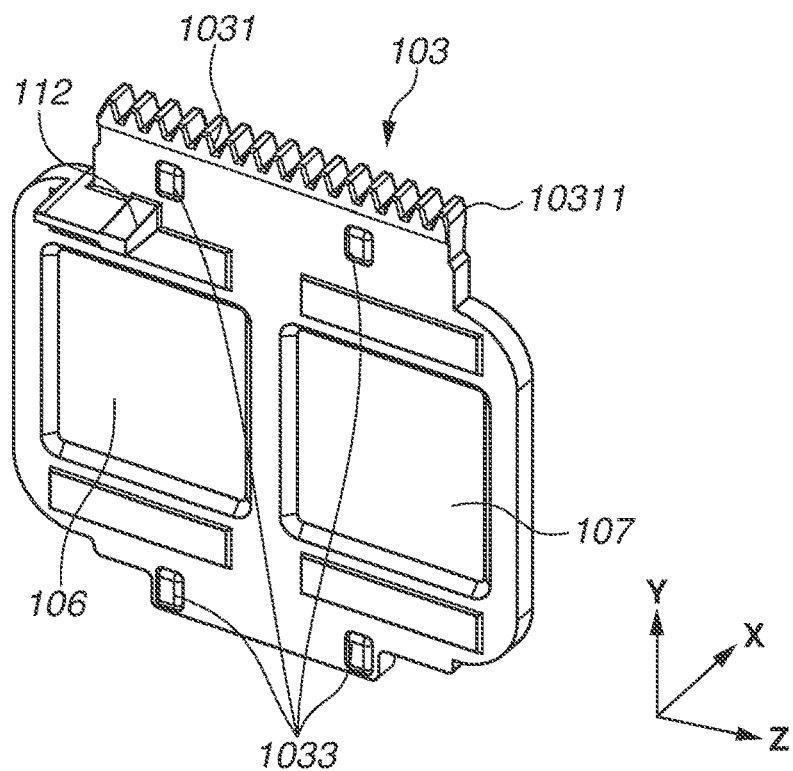
FIG. 7A illustrates a perspective view of a filter holder viewed from the front.
Figure 7B:
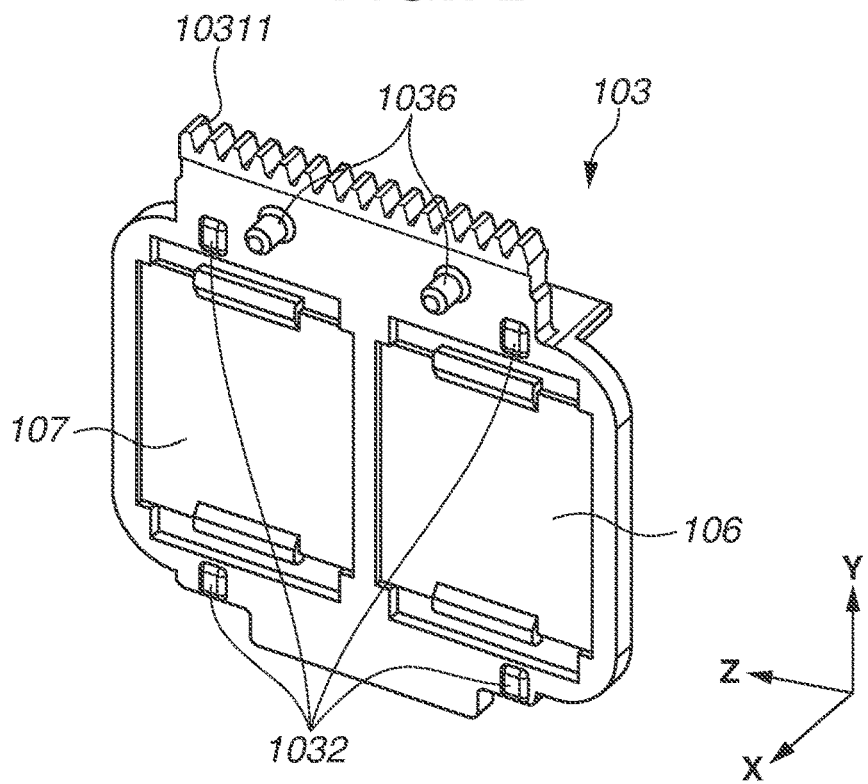
FIG. 7B illustrates a perspective view of the filter holder viewed from the back.

Next, details of the filter holder 103 will be described with reference to FIGS. 7A and 7B. FIG. 7A is a perspective view of the filter holder 103 viewed from the lens 111. FIG. 7B is a perspective view of the filter holder 103 viewed from the image sensor 5.

The filter holder 103 includes a plurality of sliding surfaces 1033, the gear engagement portion 1031 (gear), and a directing portion 10311 (guide) as illustrated in FIG. 7A. The filter holder 103 further includes a plurality of sliding surfaces 1032 and guides 1036 as illustrated in FIG. 7B.

When the filter holder 103 moves in the direction orthogonal to the optical axis 11, the sliding surfaces 1032 slide against the sliding surfaces 1022 of the filter base 102, and the guides 1036 are engaged with the guide 1026 of the filter base 102. The sliding of the filter holder 103 is thereby regulated in the direction (top-bottom direction) orthogonal to the optical axis 11.

The gear engagement portion 1031 engages with the gear train 109. The gear engagement portion 1031 transmits driving force of the motor 108 to the filter holder 103.

The directing portion 10311 is provided next to the gear engagement portion 1031. The directing portion 10311 engages with the gear train 109 when the filter base 102 is assembled to the lens holder 104. The directing portion 10311 does not engage with the gear train 109 when the IRCF 106 is placed or removed. In the present exemplary embodiment, the directing portion 10311 has a shape similar to the gear engagement portion 1031. The directing portion 10311 can have any shape as long as the shape prevents teeth tips of the gear train 109 from interfering with the filter holder 103 when the filter base 102 is assembled to the lens holder 104. However, the directing portion 10311 can also have a concavo/convex shape different from the shape of the gear engagement portion 1031, such as a sloped surface or planar surface. In the present exemplary embodiment, the directing portion 10311 is formed at one end of the gear engagement portion 1031 in the right-left direction. However, the directing portion 10311 can be formed at both ends of the gear engagement portion 1031 in the right-left direction.

The directing portion 10311 is placed at a place where the directing portion 10311 does not engage with the gear train 109 until the abutment surface 10251 of the filter base 102 abuts the abutment surface 1045 of the lens holder 104. Specifically, a leading edge of the directing portion 10311 is farther from the gear train 109 than a leading edge of the substantially acute-angled shape portion 10281 is until the abutment surface 10251 of the filter base 102 abuts the abutment surface 1045 of the lens holder 104.

<Details of Structure of Lens Holder>

Figure 8B:
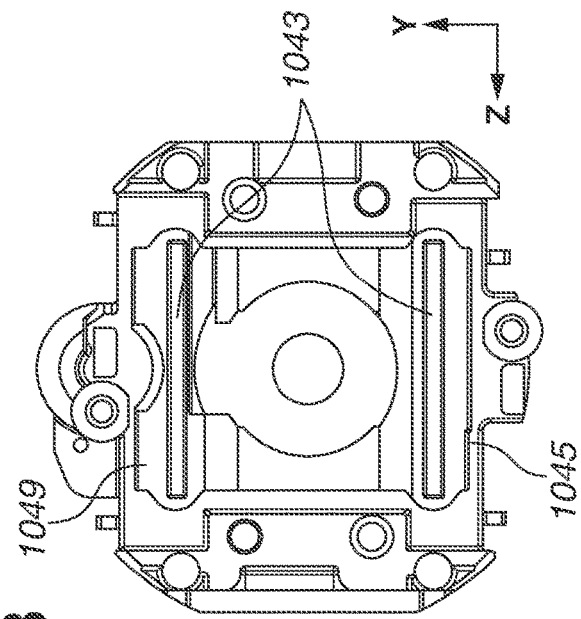
FIG. 8B illustrates an external view of the lens holder viewed from the back.
Figure 8D:
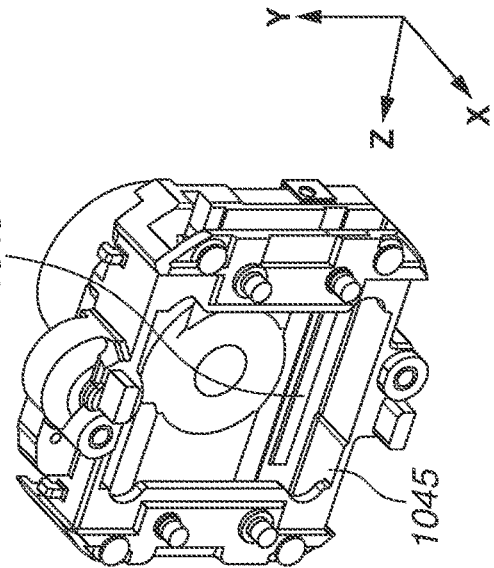
FIG. 8D illustrates a perspective view of the lens holder viewed from the back.
Figure 8A:
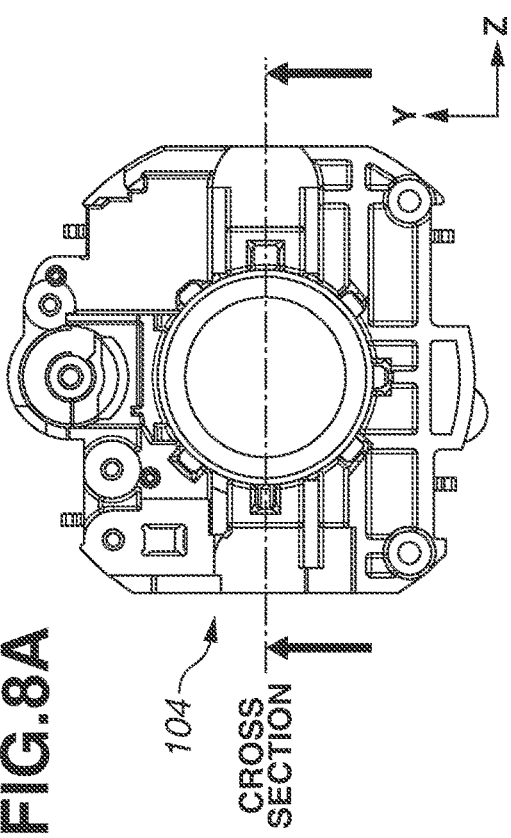
FIG. 8A illustrates an external view of a lens holder viewed from the front.
Figure 8C:
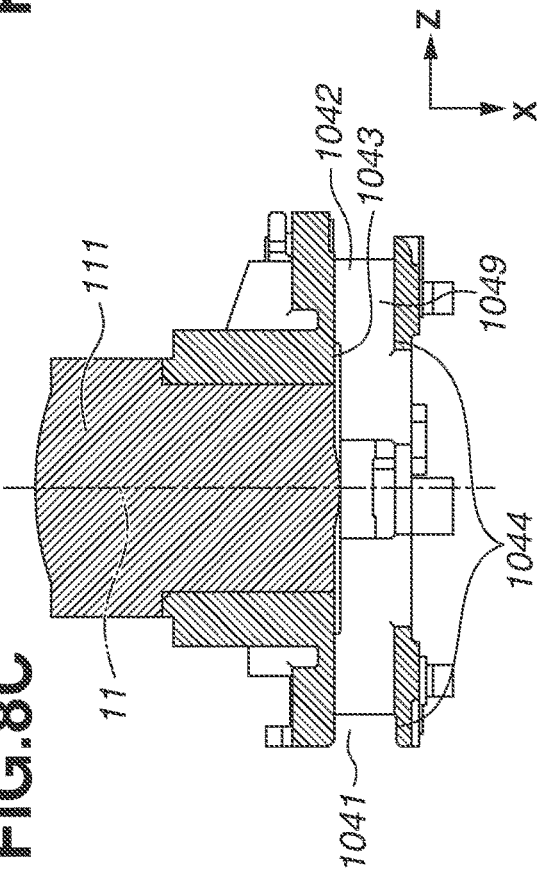
FIG. 8C illustrates a cross-sectional view of the lens holder taken along a plane including an optical axis 11 and specified by a dashed-dotted line illustrated in FIG. 8A.

Details of the lens holder 104 will now be described with reference to FIGS. 8A to 8D. FIG. 8A is an external view of the lens holder 104 viewed from the lens 111. FIG. 8B is an external view of the lens holder 104 viewed from the image sensor 5. FIG. 8C is a cross-sectional view of the lens holder 104 taken along a plane including the optical axis 11 and specified by a dashed-dotted line illustrated in FIG. 8A. FIG. 8D is a perspective view of the lens holder 104 viewed from the image sensor 5.

The lens holder 104 includes the apertures 1041 and 1042, sliding surfaces 1043, the abutment surfaces 1044 (third abutment), the abutment surface 1045 (first abutment), and the abutment surface 1049.

The apertures 1041 and 1042 are pierced through the lens holder 104 in the direction (right-left direction) orthogonal to the optical axis 11 of the lens 111 as illustrated in FIG. 8C.

In the space formed by the apertures 1041 and 1042 in the lens holder 104, a plurality of sliding surfaces 1043 is provided on an optical axis orthogonal surface (first orthogonal surface) on a lens 111 side (imaging lens side). The sliding surfaces 1043 slides against the sliding surfaces 1022 of the filter base 102 when the filter base 102 is assembled to the lens holder 104.

A plurality of abutment surfaces 1044 is provided on a second orthogonal surface, which is an optical axis orthogonal surface facing the first orthogonal surface. The abutment surfaces 1044 abut the abutment surfaces 1024 of the filter base 102.

When the assembly of the filter base 102 to the lens holder 104 is completed, the plurality of abutment surfaces 1044 abuts the plurality of abutment surfaces 1024 of the filter base 102 so that a length of a gap between the filter base 102 and the lens holder 104 in the front-back direction becomes substantially zero.

The abutment surface 1045 is a surface parallel to a plane that includes a piercing direction (right-left direction) of the aperture 1041 and the direction of the optical axis 11 of the lens 111 as illustrated in FIGS. 8B and 8D. The abutment surface 1045 abuts the abutment surface 10251 of the filter base 102 when the filter base 102 is assembled to the lens holder 104. Thus, the substantially acute-angled shape portion 10281 of the filter base 102 is brought near the inner wall of the lens holder 104, and thereby reducing entering dust.

The abutment surface 1049 abuts the abutment surface 1029 of the filter base 102 when the filter base 102 is assembled to the lens holder 104.

<Fitting Filter Base and Filter Holder to Lens Holder>

A procedure of assembling the filter base 102 and the filter holder 103 to the lens holder 104 will now be described with reference to FIGS. 9A to 12G.

Figure 9B:
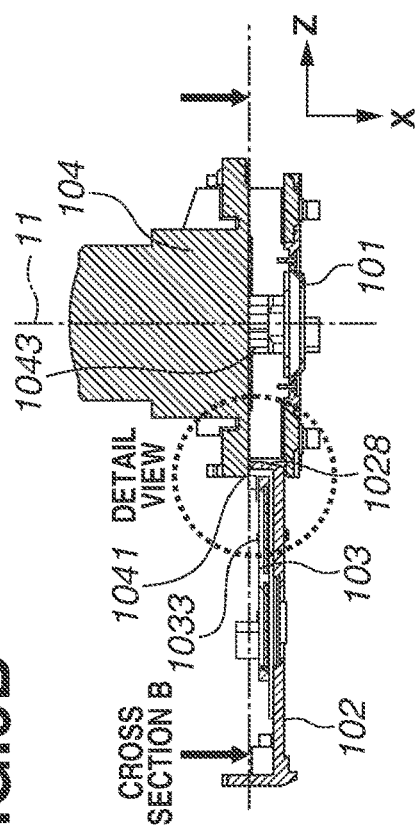
FIG. 9B is a diagram illustrating a state where the filter base is being assembled to the lens holder.
Figure 9D:
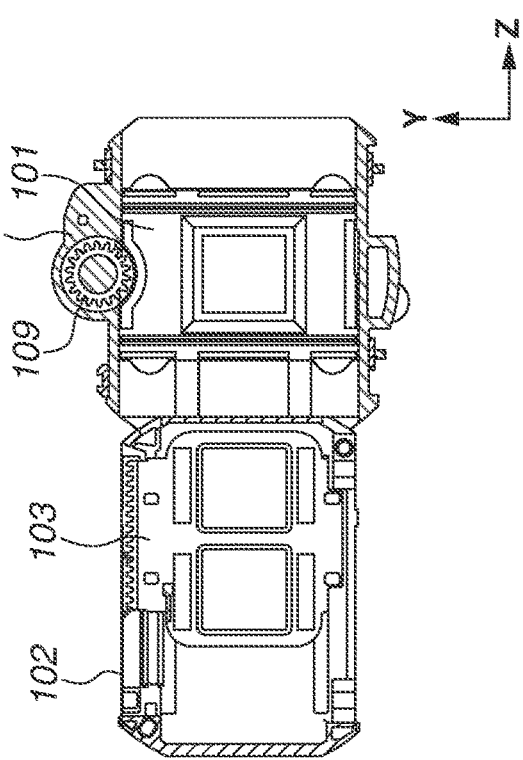
FIG. 9D is a diagram illustrating a state where the filter base is being assembled to the lens holder.
Figure 9A:
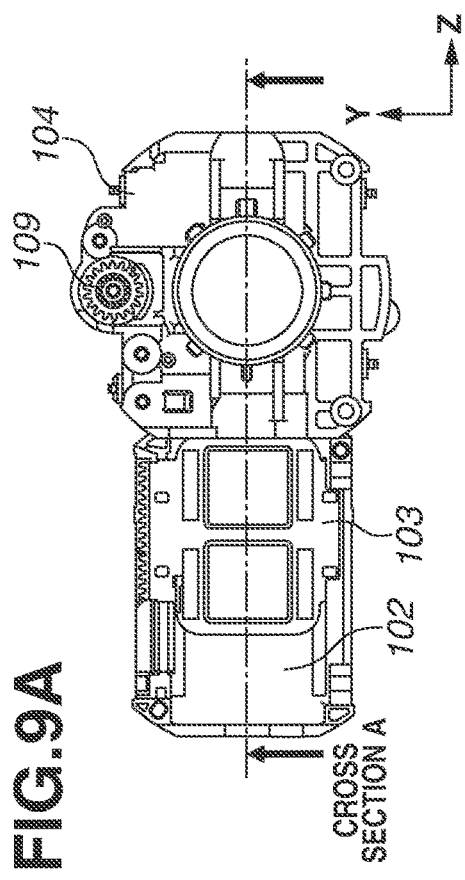
FIG. 9A is a diagram illustrating a state where the filter base is being assembled to the lens holder.
Figure 9C:
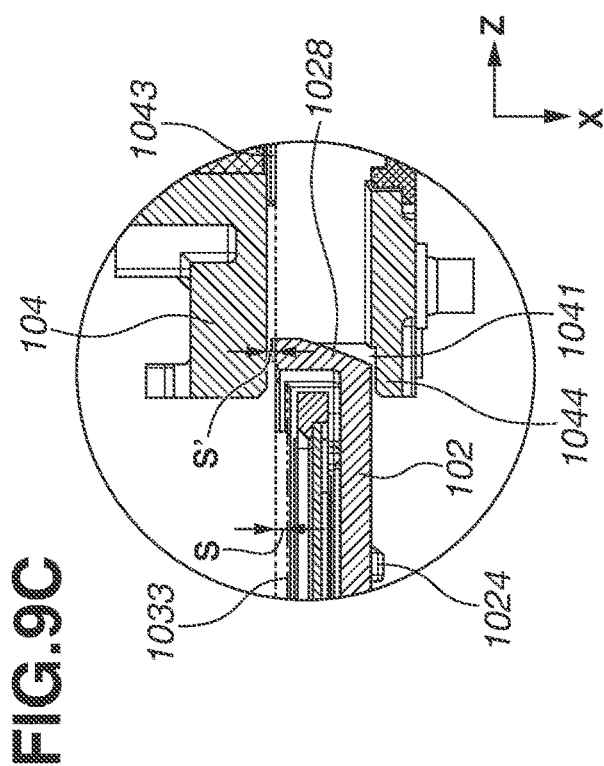
FIG. 9C is a diagram illustrating a state where the filter base is being assembled to the lens holder.

FIGS. 9A to 9D illustrate a state where assembly of the filter base 102 to the lens holder 104 is started. FIG. 9A is an external view as viewed from the lens 111. FIG. 9B is a cross-sectional view taken along a plane (cross section A) including the optical axis 11 and specified by a dashed-dotted line illustrated in FIG. 9A as viewed from the bottom. FIG. 9C is a detail view of a region around the side wall 1028 specified by a dotted line illustrated in FIG. 9B. FIG. 9D is a cross-sectional view taken along a cross section B specified in FIG. 9B.

In FIG. 9A to FIG. 12G, the relationship between the gear train 109 and the filter base 102 is focused, so that the motor 108 and the gear cover 113 are not illustrated. However, the motor 108 and the gear cover 113 can be attached. The image sensor protection rubber 101 is attached to the lens holder 104 before the filter base 102 and the filter holder 103 are assembled to the lens holder 104. Alternatively, the filter base 102 and the filter holder 103 can be assembled to the lens holder 104 before the image sensor protection rubber 101 is attached to the lens holder 104.

The filter holder 103 is assembled to the filter base 102. Specifically, the filter holder 103 is assembled to the filter base 102 such that the sliding surfaces 1022 of the filter base 102 faces the sliding surfaces 1032 of the filter holder 103 and the guide 1026 of the filter base 102 faces to the guides 1036 of the filter holder 103 as described above.

The filter base 102 is assembled into the lens holder 104 in the right-left direction from the aperture 1041 formed on the lens holder 104, as illustrated in FIG. 9B. At this time, the substantially acute-angled shape portion 10281 of the filter base 102 and the gear train 109 are not in contact with each other.

The abutment surfaces 1024 of the filter base 102 does not abut the abutment surfaces 1044 of the lens holder 104 in the front-back direction as illustrated in FIG. 9C. Thus, there is a space S between the sliding surfaces 1033 of the filter holder 103 and the sliding surfaces 1043 of the lens holder 104, and there is a space S' between the filter base 102 and the lens holder 104 as illustrated in FIG. 9C. There is also a space between the aperture 1041 of the lens holder 104 and the side wall 1028 of the filter base 102. Although a length of S is greater than a length of S' as illustrated in FIG. 9C, the relationship between these spaces is not limited thereto.

The abutment surface 10251 of the filter base 102 does not abut the abutment surface 1045 of the lens holder 104 in the top-bottom direction. Thus, the substantially acute-angled shape portion 10281 of the filter base 102 and the inner wall of the lens holder 104 are not yet near each other.

Each state illustrated in FIGS. 10A to 10D will now be described.

FIGS. 10A to 10D illustrate a state where the gear train 109 and the filter base 102 are brought into contact with each other. FIG. 10A is an external view viewed from the lens 111. FIG. 10B is a cross-sectional view taken along a plane (cross section A) including the optical axis 11 and specified by a dashed-dotted line illustrated in FIG. 10A as viewed from the bottom. FIG. 10C is a cross-sectional view taken along a cross section B specified by a dashed-dotted line illustrated in FIG. 10B. FIG. 10D is a detail view of a region around the gear train 109 that is specified by a dotted line in FIG. 10C.

If the filter base 102 is assembled in the right-left direction from the state illustrated in FIGS. 9A to 9D, the gear train 109 and the substantially acute-angled shape portion 10281 of the filter base 102 come into contact and are engaged with each other as illustrated in FIGS. 10A to 10D. If the filter base 102 is further assembled in the right-left direction, the gear train 109 rotates, and the filter base 102 is assembled to the lens holder 104. The bottom plate 1023 of the filter base 102 is placed lower than the gear train 109, so that the bottom plate 1023 is prevented from coming into contact with the gear train 109.

At this time, the abutment surfaces 1024 of the filter base 102 does not abut the abutment surfaces 1044 of the lens holder 104. Thus, at this time, there are spaces S and S' provided as illustrated in FIG. 9C. There is also a space between the aperture 1041 of the lens holder 104 and the side wall 1028 of the filter base 102 in the front-back direction.

The abutment surface 10251 of the filter base 102 does not abut the abutment surface 1045 of the lens holder 104 in the top-bottom direction. Thus, the substantially acute-angled shape portion 10281 of the filter base 102 and the inner wall of the lens holder 104 are not yet near each other.

A state illustrated in FIGS. 11A to 11G will now be described.

Figure 11A:
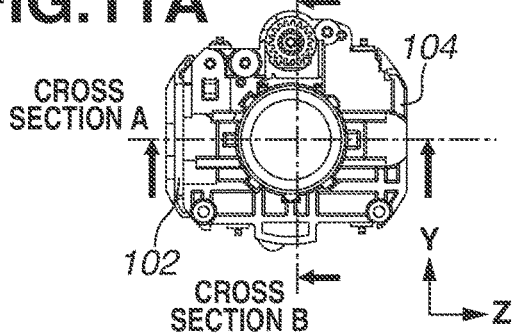
FIG. 11A is a diagram illustrating a state immediately before assembly of the filter base to the lens holder is completed.
Figure 11B:
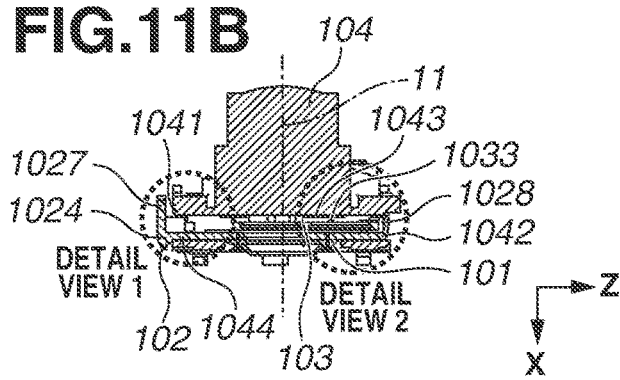
FIG. 11B is a diagram illustrating a state immediately before assembly of the filter base to the lens holder is completed.
Figure 11C:
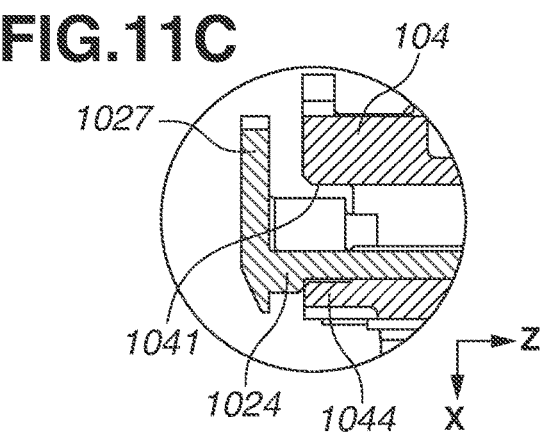
FIG. 11C is a diagram illustrating a state immediately before assembly of the filter base to the lens holder is completed.
Figure 11D:
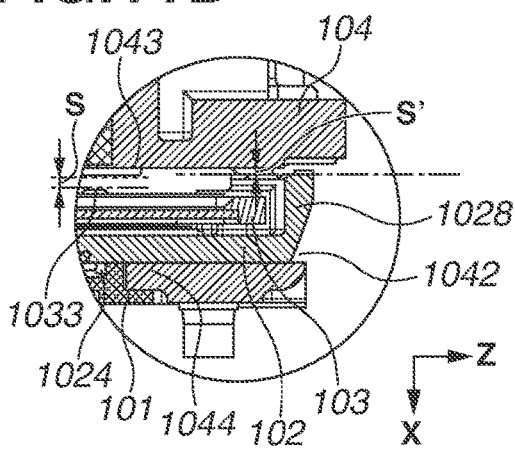
FIG. 11D is a diagram illustrating a state immediately before assembly of the filter base to the lens holder is completed.
Figure 11E:
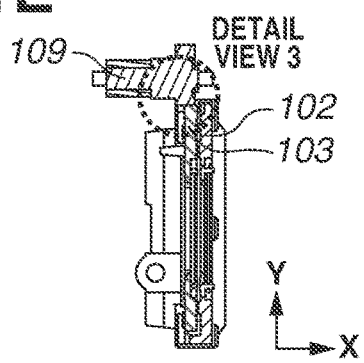
FIG. 11E is a diagram illustrating a state immediately before assembly of the filter base to the lens holder is completed.
Figure 11F:
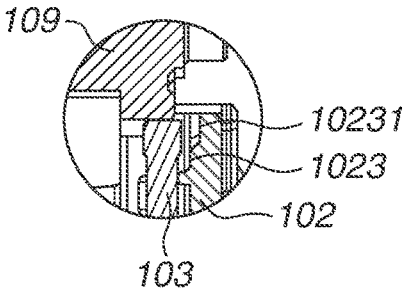
FIG. 11F is a diagram illustrating a state immediately before assembly of the filter base to the lens holder is completed.
Figure 11G:
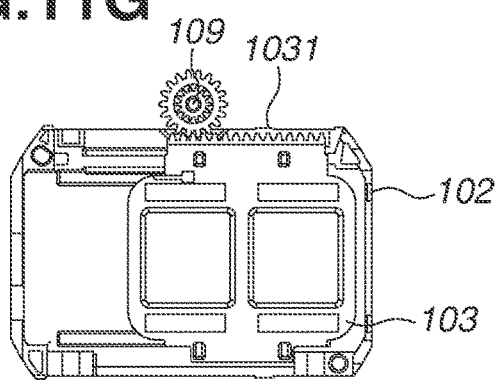
FIG. 11G is a diagram illustrating a state immediately before assembly of the filter base to the lens holder is completed.

FIGS. 11A to 11G illustrate a state immediately before the lens holder 104 has been assembled to the filter base 102. FIG. 11A is an external view viewed from the lens 111. FIG. 11B is a cross-sectional view taken along a plane (cross section A) including the optical axis 11 and specified by a dashed-dotted line illustrated in FIG. 11A as viewed from the bottom. FIG. 11C is a detail view (detail view 1) of a region around the aperture 1041 specified by a dotted line illustrated in FIG. 11B. FIG. 11D is a detail view (detail view 2) of a region around the aperture 1042 specified by another dotted line illustrated in FIG. 11B. FIG. 11E is a schematic cross-sectional view taken along a cross section B specified by another dashed-dotted line illustrated in FIG. 11A. FIG. 11F is a detail view (detail view 3) of a region around the gear train 109 specified by a dotted line illustrated in FIG. 11E. FIG. 11G illustrates a state of engagement around the gear train 109. In FIG. 11E, relationships are focused among the gear train 109, the filter base 102, and the filter holder 103, so that the other members are omitted.

If the filter base 102 is further assembled in the right-left direction from the state illustrated in FIGS. 10A to 10D, the abutment surface 10251 of the filter base 102 abuts the abutment surface 1045 of the lens holder 104. Consequently, the filter base 102 moves upward, and the directing portion 10311 of the filter holder 103 engages with the gear train 109. Thereafter, the filter base 102 moves in the right-left direction while the gear engagement portion 1031 of the filter holder 103 engages with the gear train 109, as illustrated in FIG. 10G. The bottom plate 1023 of the filter base 102 is brought near the gear train 109. However, the depressed portion 10231 is provided, and thereby the bottom plate 1023 is prevented from coming into contact with the gear train 109.

The abutment surfaces 1024 of the filter base 102 do not abut the abutment surfaces 1044 of the lens holder 104. Thus, at this time, there are spaces S and S' provided as illustrated in FIG. 9C. There is also a space between the apertures 1041 and 1042 of the lens holder 104 and the side walls 1027 and 1028 of the filter base 102 in the front-back direction.

As described above, the abutment surface 10251 of the filter base 102 abuts the abutment surface 1045 of the lens holder 104. The substantially acute-angled shape portion 10281 of the filter base 102 is thereby near the inner wall of the lens holder 104.

A state illustrated in FIGS. 12A to 12G will now be described.

Figure 12A:
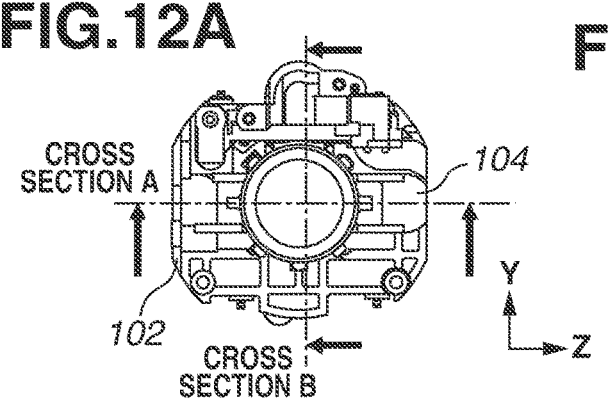
FIG. 12A is a diagram illustrating a state where assembly of the filter base to the lens holder is completed.
Figure 12B:
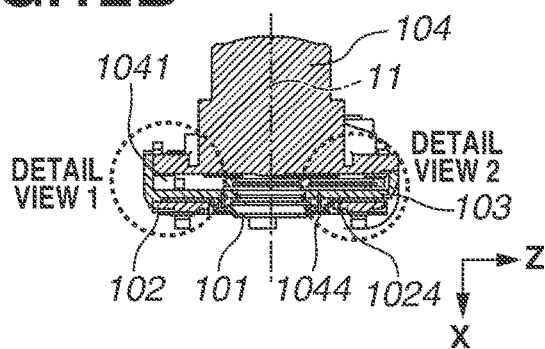
FIG. 12B is a diagram illustrating a state where assembly of the filter base to the lens holder is completed.
Figure 12C:
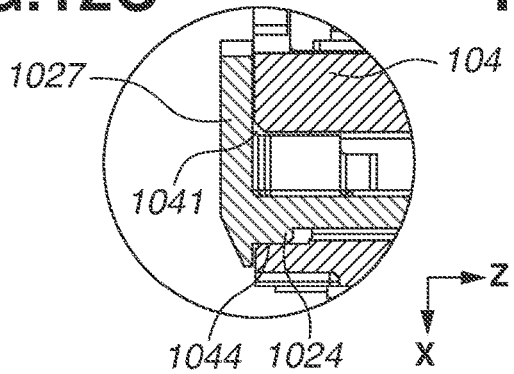
FIG. 12C is a diagram illustrating a state where assembly of the filter base to the lens holder is completed.
Figure 12D:
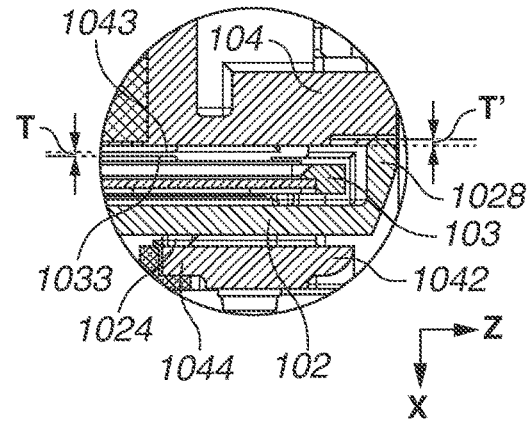
FIG. 12D is a diagram illustrating a state where assembly of the filter base to the lens holder is completed.
Figure 12E:
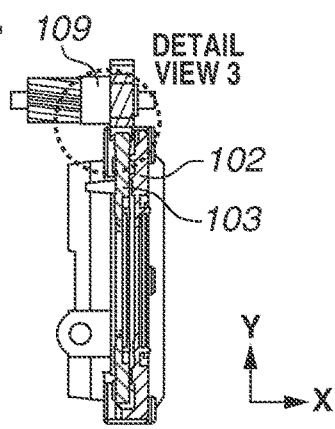
FIG. 12E is a diagram illustrating a state where assembly of the filter base to the lens holder is completed.
Figure 12F:
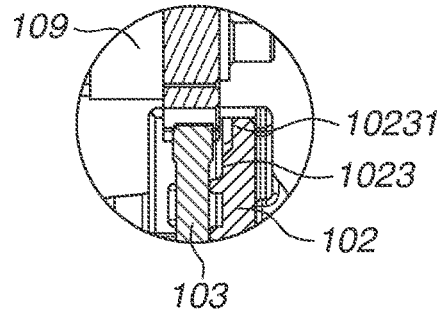
FIG. 12F is a diagram illustrating a state where assembly of the filter base to the lens holder is completed.
Figure 12G:
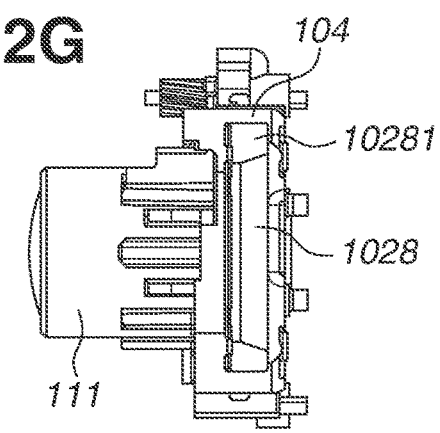
FIG. 12G is a diagram illustrating a state where assembly of the filter base to the lens holder is completed.

FIGS. 12A to 12G illustrate a state where the lens holder 104 has been assembled to the filter base 102. FIG. 12A is an external view viewed from the lens 111. FIG. 12B is a cross-sectional view taken along a plane (cross section A) including the optical axis 11 and specified by a dashed-dotted line illustrated in FIG. 12A as viewed from the bottom. FIG. 12C is a detail view (detail view 1) of a region around the aperture 1041 specified by a dotted line illustrated in FIG. 12B. FIG. 12D is a detail view (detail view 2) of a region around the aperture 1042 specified by another dotted line illustrated in FIG. 12B. FIG. 12E is a schematic cross-sectional view taken along a cross section B specified by another dashed-dotted line illustrated in FIG. 12A. FIG. 12F is a detail view (detail view 3) of a region around the gear train 109 specified by a dotted line illustrated in FIG. 12E. FIG. 12G is a side view of the lens holder 104. In FIG. 12E, relationships are focused among the gear train 109, the filter base 102, and the filter holder 103, so that the other members are omitted.

If the filter base 102 is further assembled in the right-left direction from the state illustrated in FIGS. 11A to 11G, the filter base 102 is in a state where the assembly has been completed as illustrated in FIGS. 12A to 12G.

At this time, the abutment surfaces 1024 of the filter base 102 abut the abutment surfaces 1044 of the lens holder 104. Consequently, the spaces S and S' in assembling are narrowed to spaces T and T', so that the space is reduced. Specifically, a length of S is greater than a length of T and a length of S' is greater than a length of T', and the sliding surfaces 1033 of the filter holder 103 slidably abut the sliding surfaces 1043 of the lens holder 104, and the filter base 102 abuts the lens holder 104 such that the filter base 102 is tightly fixed to the lens holder 104. Further, a space between the apertures 1041 and 1042 of the lens holder 104 and the side walls 1027 and 1028 of the filter base 102 is substantially zero in the front-back direction.

The substantially acute-angled shape portion 10281 of the filter base 102 is near the inner wall of the lens holder 104 as illustrated in FIG. 12G, and thus a distance between the filter base 102 and the lens holder 104 is substantially zero when viewed from the side.

Benefits

As described above, when the filter base 102 is assembled to the lens holder 104, the gear train 109 engages with the substantially acute-angled shape portion 10281 of the filter base 102, and the gear train 109 rotates. The filter base 102 can thereby be assembled to the lens holder 104 even in a state where the gear train 109 is placed on the lens holder 104. Thus, the filter base 102 can be assembled to and removed from the lens holder 104 regardless of the presence/absence of the gear train 109, so that ease of assembly and removal increases.

When the filter base 102 is assembled to the lens holder 104, the bottom plate 1023 of the filter base 102 comes near the gear train 109. However, the bottom plate 1023 is prevented from coming into contact with the gear train 109 by providing the depressed portion 10231.

When assembly of the filter base 102 to the lens holder 104 is completed, a length of a gap between the side walls 1027 and 1028 of external surfaces of the filter base 102 and the apertures 1041 and 1042 of the lens holder 104 becomes substantially zero, and thereby external dust can be prevented from entering and incident light can also be reduced.

Even while the aperture 1042 is pierced, the side wall 1028 and the aperture 1042 come near each other by providing the substantially acute-angled shape portion 10281, and thereby reducing entering dust.

Other Modified Examples

While the filter base 102 and the lens holder 104 have the sliding surfaces 1022 and 1043 in the present exemplary embodiment, the filter base 102 can have a cover member and sliding surfaces in the optical axis direction and then the filter base 102 can be inserted. Although the actuator 105 is not illustrated in FIGS. 9A to 12G, the gear train 109 can directly be connected to the motor 108 and driven by the motor 108, or a plurality of gear trains 109 can be connected together and driven indirectly by the motor 108.

While assembly is described in the present exemplary embodiment, it should be noted that removal is also executable by executing the removal in reverse order of the assembly.

While various exemplary embodiments of the disclosure are described above, the descriptions herein are not intended to limit the disclosure. Various modified examples including deletion, addition, and replacement of components are possible within the technical scope of the disclosure.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-204310, filed Nov. 11, 2019, which is hereby incorporated by reference herein in its entirety.

What is claimed is:

1. An apparatus comprising:
a fixing component configured to fix an imaging lens and have a side surface including an opening;
a holding frame configured to hold an optical element and has a gear;
a holding base configured to be inserted into the opening from a direction orthogonal to an optical axis of the imaging lens and hold the holding frame; and
a driving gear configured to drive the holding frame in the direction orthogonal to the optical axis of the imaging lens, wherein the gear is arranged to engage with the driving gear;
wherein the holding base has an engagement portion that engages with the driving gear when the holding base is inserted into the opening,
wherein the engagement portion has a shape that is substantially the same as teeth of the gear.

2. The apparatus according to claim 1,
wherein the opening is pierced through the fixing component in the direction orthogonal to the optical axis, and
wherein the holding base includes a side wall that fills the opening when an insertion of the holding base is completed in the opening.

3. The apparatus according to claim 2,
wherein the holding base has a first abutment that is a surface parallel to a plane that includes a piercing direction of the opening and a direction of the optical axis of the imaging lens,
wherein the fixing component has a second abutment that abuts the first abutment, and
wherein the side wall is brought near the fixing component when the first abutment and the second abutment abut each other.

4. The apparatus according to claim 2, wherein the side wall includes the engagement portion.

5. The apparatus according to claim 1, wherein the holding frame includes:
a guide configured to be next to the gear and abut the driving gear when the holding base is inserted into the fixing component.

6. The apparatus according to claim 5, wherein the guide does not abut the driving gear when the holding frame is removed from or placed on an optical path.

7. The apparatus according to claim 1,
wherein a surface of the fixing component on a side of the imaging lens in an internal space in the fixing component formed by the opening is a first orthogonal surface orthogonal to the optical axis,
wherein a surface of the fixing component that faces the first orthogonal surface is a second orthogonal surface orthogonal to the optical axis,
wherein the fixing component includes a third abutment on the second orthogonal surface, and
wherein the holding base includes a fourth abutment that abuts the third abutment in the direction of the optical axis.

8. The apparatus according to claim 7, wherein the holding base has a bottom portion that is not in contact with the driving gear when the third abutment and the fourth abutment do not abut each other, the bottom portion is plate shape.

9. The apparatus according to claim 8, wherein the bottom portion has a depressed portion that is not in contact with the driving gear when the third abutment and the fourth abutment abut each other.

10. The apparatus according to claim 7, wherein a plurality of the third abutments and a plurality of the fourth abutments are provided.

11. The apparatus according to claim 1, wherein the driving gear is directly or indirectly connected to a motor and driven by the motor.

* * * * *